(12) United States Patent
Pintsov et al.

(10) Patent No.: US 7,991,705 B2
(45) Date of Patent: Aug. 2, 2011

(54) MAIL PROCESSING SYSTEM FOR DETERMINING MAIL ENTITY DEFECTS AND CORRECTING MAIL ENTITY DEFECTS

(75) Inventors: Leon A Pintsov, West Hartford, CT (US); Andrei Obrea, Seymour, CT (US)

(73) Assignee: Pitney Bowes Inc., Stamford, CT (US)

( * ) Notice: Subject to any disclaimer, the term of this patent is extended or adjusted under 35 U.S.C. 154(b) by 954 days.

(21) Appl. No.: 11/200,640

(22) Filed: Aug. 10, 2005

(65) Prior Publication Data
US 2006/0079991 A1  Apr. 13, 2006

Related U.S. Application Data

(60) Provisional application No. 60/614,070, filed on Sep. 29, 2004.

(51) Int. Cl.
*G06Q 30/00* (2006.01)

(52) U.S. Cl. ........................... 705/336; 705/330

(58) Field of Classification Search .................. 235/375, 235/462.01; 700/225; 380/55; 705/330, 705/336
See application file for complete search history.

(56) References Cited

U.S. PATENT DOCUMENTS

| | | | | |
|---|---|---|---|---|
| 5,043,908 A | * | 8/1991 | Manduley et al. | ............ 700/227 |
| 5,079,714 A | | 1/1992 | Manduley et al. | |
| 5,388,049 A | * | 2/1995 | Sansone et al. | ................ 705/406 |
| 5,422,821 A | * | 6/1995 | Allen et al. | .................... 700/219 |
| 6,959,292 B1 | | 10/2005 | Pintsov | |
| 2001/0054031 A1 | | 12/2001 | Lee et al. | |
| 2002/0027989 A1 | * | 3/2002 | Herbert | ........................... 380/55 |
| 2002/0144154 A1 | | 10/2002 | Tomkow | |
| 2002/0165729 A1 | * | 11/2002 | Kuebert et al. | ................... 705/1 |
| 2003/0046103 A1 | * | 3/2003 | Amato et al. | ..................... 705/1 |
| 2003/0114956 A1 | * | 6/2003 | Cullen et al. | ................. 700/225 |
| 2004/0031846 A1 | | 2/2004 | Burgess | |
| 2005/0132071 A1 | | 6/2005 | Pintsov | |
| 2005/0199722 A1 | * | 9/2005 | Borja | ....................... 235/462.01 |

FOREIGN PATENT DOCUMENTS

| | | |
|---|---|---|
| GB | 2189064 A1 | 10/1987 |
| WO | 02/070149 A2 | 12/2002 |

OTHER PUBLICATIONS

Baker et al. (WO 02/29639 A1).*
"Pitney Bowes Introduces Video Coding for Inbound Mail Management to Enhance Sorting", Business Wire, Mar. 26, 2001.*

* cited by examiner

*Primary Examiner* — John Hayes
*Assistant Examiner* — Kevin Flynn
(74) *Attorney, Agent, or Firm* — Steven J. Shapiro; Charles R. Malandra, Jr.

(57) ABSTRACT

A method for providing a mailer with detailed information regarding the mailer's preparation of mail entities and the post's processing of mail entities. The foregoing allows the mailer to improve subsequent preparation of mail entities to make it easier for the post to process and deliver mail in a timely manner. The invention also allows the post and the mailer to distinguish between mailer's processing defects and errors caused by faulty postal equipment.

21 Claims, 13 Drawing Sheets

$Observation_1 = \{ Attribute_1^1, Attribute_2^1, \ldots, Attribute_K^1, \ldots, Attribute_N^1 \}$ time = $t_1$ $Observation_2 = \{ Attribute_1^2, Attribute_2^2, \ldots, Attribute_K^2, \ldots, Attribute_N^2 \}$ time = $t_2$ $\vdots$ $Observation_M = \{ Attribute_1^M, Attribute_2^M, \ldots, Attribute_K^M, \ldots, Attribute_N^M \}$ time = $t_M$ $Expectation_1 = \{ Attribute_1^1, Attribute_2^1, \ldots, Attribute_K^1, \ldots, Attribute_N^1 \}$ time = $t_{T+1}$ $Expectation_2 = \{ Attribute_1^2, Attribute_2^2, \ldots, Attribute_K^2, \ldots, Attribute_N^2 \}$ time = $t_{T+2}$ $\vdots$ $Expectation_P = \{ Attribute_1^P, Attribute_2^P, \ldots, Attribute_K^P, \ldots, Attribute_N^P \}$ time = $t_{T+P}$ $Event_A^{J,K} = \{ Observation_J, Observation_K | Expectation_{K'} (Observation_J - Observation_K | Expectation_{K'}) \}$

FIG.4

MAIL PROCESSING SYSTEM FOR DETERMINING MAIL ENTITY DEFECTS AND CORRECTING MAIL ENTITY DEFECTS

This Application claims the benefit of the filing date of U.S. Provisional Application No. 60/614,070 filed Sep. 29, 2004, which is owned by the assignee of the present Application.

CROSS REFERENCE TO RELATED APPLICATIONS

Reference is made to commonly assigned co-pending patent application Docket No. F-894-O1 filed herewith entitled "Detecting And Reporting Events In A Mail Processing System" in the name of Leon Pintsov and Andrei Obrea.

FIELD OF THE INVENTION

The invention related generally to the field of mail processing systems and more particularly to customer directed services related to the handling and delivery of mail entities.

BACKGROUND OF THE INVENTION

Letters, flats or packages (mail entities) go through a number of human and equipment processing steps before they enter the postal stream. For instance, some of the steps for preparing mail entities are printing the address on the face of the mail entities, inserting sheets of paper into the mail entities, printing proof payment and indications for selected services (e.g., confirmation of delivery). Some of the steps for inducting mail entities into the mail stream involve presorting based on destination and placing mail entities in postal trays to obtain postal discounts.

After mail is inducted into the postal stream, then the mail entities are scanned to lift the image of the face of the mail entities for processing. The processing includes the detection of various areas of interest like Destination Address Block (DAB), Special Marks Block (SMB), Return Address Block, etc. Within each area of interest specialized software and hardware analyzes the image to capture the text or various values indicative of preferences and information conveyed by the sender to the post. Examples are destination address, services requested, proof of payment information, etc.

During the processing of mail entities a variety of defects may occur. For example, during image capture, information recognition and interpretation the address may not be read correctly because the printing of the address is smudged, the font used to print the address is not recognized by the optical character recognition (OCR) equipment, or the position of the address is in an incorrect location, etc. The address may also be skewed with respect to the bottom and top edges of the mail entities, or the line spacing of the address may not permit OCR equipment to read the address. Furthermore, the address may simply be incorrect.

Typically it takes the post three to five days to deliver letters and/or packages to a recipient. Thus the sender of mail entities may decide to track the progress of the mail entities through the postal processing system. The defects cause the post to use manual labor to correctly process the mail entities in the presence of defects, for example using human judgment to identify the destination address that cannot be recognized using automated equipment. In most cases, the aforementioned defects are noticed by the post and are not conveyed back to the mailer. Thus, the mailer is unaware of the difficulties encountered by the post in processing mail entities from this particular mailer, hence the mailer continues to create mail entities containing the same defects resulting in additional cost of mail processing for the post. This also causes continued delays in the delivery of the mail and eventually dissatisfaction of the mailer, the post and mail recipients.

One of the problems of the prior art is that there is no feedback from the post to the mailer regarding defects in the preparation of the mail entity that cause the post additional effort to process the mail.

Another problem of the prior art is that defects in the preparation of mail entities cause delays in the delivery of mail entities.

An additional problem of the prior art is that defects in the preparation of mail entities may be so severe that the post is unable to deliver the mail entity.

A further problem with the prior art is that the post was unable to determine whether or not the root cause of additional manual processing, delays or un-deliverability of mail entities was caused by postal equipment malfunction or by defects in the mailer's preparation of the mail entity.

SUMMARY OF THE INVENTION

This invention overcomes the disadvantages of the prior art by providing the mailer with detailed information regarding mailer's preparation of mail entities and the post's processing of mail entities. The foregoing allows the mailer to improve subsequent preparation of mail entities to make it easier for the post to process and deliver mail in a timely manner. The invention also allows the post and the mailer to distinguish between mailer's processing defects and errors caused by faulty postal equipment. For instance, the post is able to report to the mailer that the address on the mail entity is skewed with respect to the bottom and top edges of the mail entity, or the line spacing of the address may not permit OCR equipment to read the address, or the address may simply be incorrect.

The foregoing is accomplished by:

defining attributes of the mail entities defining an observation at a given point in time as a set of measured values of mail entity attributes defining an expectation at a given point in time as set of future values of mail entity attributes defining an event as changes in the values of the attributes between two observations or between an observation and an expectation making observations in the Mailer's process creating expectations in the Mailer's process about events in the Mailer, Post and Recipient processes making observations in the Post's processes creating expectations in the Post's process about events in the Post and Recipient processes, making observations in the Recipient's processes creating expectations in the Recipient's process about events in the Recipient processes, storing observations obtained during Mailer's process storing observations obtained during Post's processes storing observations obtained during Recipient's process determining occurrences of events during Mailer's, Post's, and Recipient's processes determining which events are expected and which are unexpected according to predetermined business rules communicating information about events (including observations and expectations) to mailer, post and recipients according to business rules expectations, observations and events from Mailer to Post and Recipient expectations, observations and events from Post to Mailer and Recipient expectations, observations and events from Recipient to Posts and Mailer defining events as changes in values of attributes within ranges and/or probabilities of values and time intervals due to pairs of observations or observations/expectations defining events as changes in values of combinations of attributes due to pairs of observations or observations/expectations

BRIEF DESCRIPTION OF THE DRAWINGS

FIG. 4 is a drawing showing the relationship between mail entity attributes, observations, expectations and events;

DETAILED DESCRIPTION OF A PREFERRED EMBODIMENT

Figure 1:
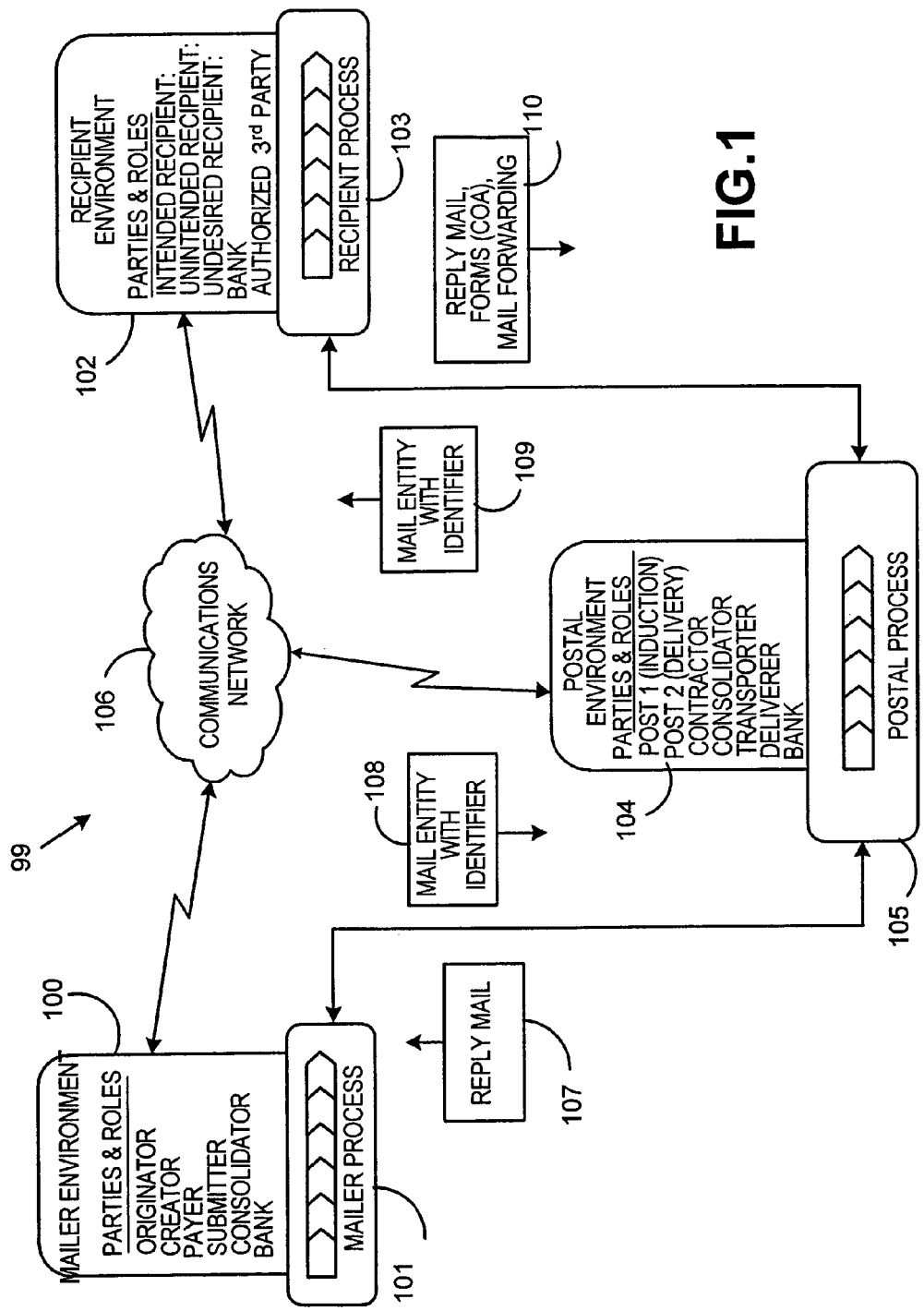
FIG. 1 is a drawing of a mail communications system.

Referring now to the drawings in detail and more particularly, to FIG. 1, the reference character 99 represents a mail entity communications system. Block 100 shows the parties and roles in the mailer environment namely, originator, creator, payer, submitter, consolidator and bank. Block 101 shows the mailer process flow. The mailer process flow is more fully described in the section explaining FIG. 7. Block 102 shows the parties and roles in the recipient environment namely, intended recipient, unintended recipient, undesired recipient, bank, and authorized third party. Block 103 shows the recipient process flow. The recipient process flow is more fully described in the section explaining FIG. 8. Block 104 shows the parties and roles in the postal environment namely, post 1 (induction), post 2 (delivery), contractor, consolidator, transporter, deliverer, and bank. Block 105 shows the postal process flow. The postal process flow is more fully described in the description of FIG. 6.

Blocks 100, 101, 102, 103, 104 and 105 may electronically communicate with each other via communication network 106, i.e., Internet, telephone, facsimile. Money and information may be transmitted over network 106. Postal process 105 may be used to transmit physical information, and physical objects to and from mailer process 101 to recipient process 103.

Block 108 shows mail entity 31 with identifier 35 traveling through the postal distribution system.

Block 109 shows mail entity 31 with identifier 35 arriving at recipient environment 102.

Block 110 shows a reply mail entity 41 that has been submitted by the recipient for delivery to the sender.

Block 107 shows reply mail 41 arriving at the original mailer environment 100. Communications network 106 enables the exchange of computerized information between mailer, postal and recipient environments.

Computerized information may be used to capture mail entity attribute values at various steps of mail entity processing. The attribute values are measured, stored, processed and communicated as indicated above and they are more fully described in the descriptions of FIGS. 4 and 5. The values of mail entity attributes may change as a result of various processing steps in the mailer's, post's and recipient's environments.

Figure 2:
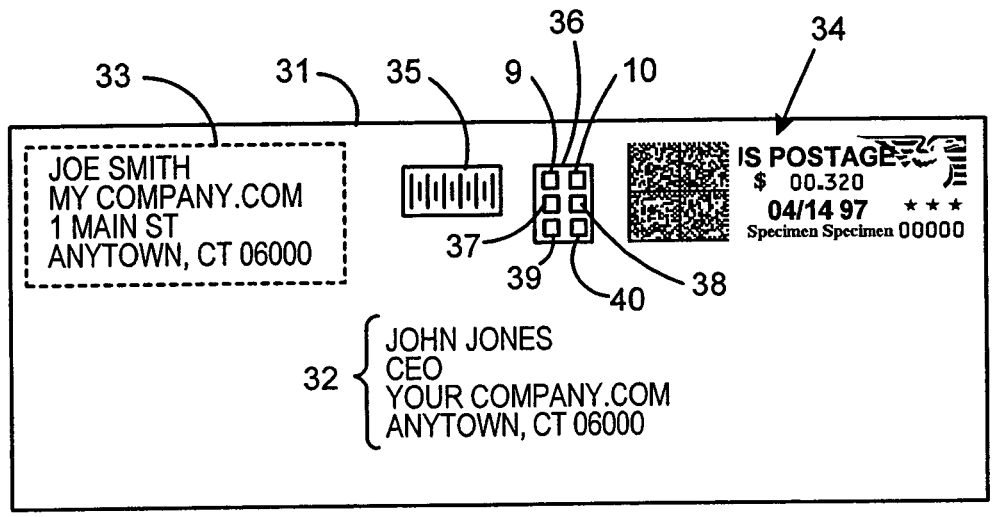
FIG. 2 is a drawing of mail entity 31.

FIG. 2 is a drawing of mail entity 31. Mail entity 31 has a recipient delivery address block (DAB) 32, an origination address block 33, a digital indication of postal payment (digital postage mark) 34, a mail entity identifier 35, and a service indicator 36. Service indicator 36 has blocks 9, 10, 37, 38, 39 and 40 that may be used to indicate the requested service. Block 9 is used to indicate services that may be requested by the sender for information that is needed to correct technical defects on the face of the mail entity and block 10 is used to indicate services that may be requested by the sender for information that is needed to correct information present on mail entity (semantic defects). Blocks 37-40 contain information defining what should happen to mail entity 31 if the services as requested can not be performed because of incorrect address information, or the services can not be performed within the allotted time, (i.e., mail entity 31 is time-sensitive, i.e., notification of a sale to take place on Monday, Oct. 1). Thus, the sender does not want mail entity 31 to be delivered after October 1. For example, a check mark in block 37 can indicate that mail entity 31 would need to be physically destroyed if it could not be delivered passed an indicated date, for example passed Apr. 17, 1997, which is three (3) days past the date indicated in the digital postage mark 34. Similarly, block 38 may indicate that mail entity 31, must be returned to a person identified in origination address block 33 after Apr. 17, 1997. Blocks 39 and 40 may indicate alternate locations for the disposal of mail entity 31, i.e., a predetermined and agreed upon post office box located at Anytown, Conn. 06000 as indicated in the destination address block 32.

Mail processing and sorting equipment is programmed to automatically determine in the case of incorrectly addressed but deliverable mail whether the requested service by the mailer can be performed within the time constraints specified by the mailer and not performed by the delivery process in accordance with the customer's request. For example, the normal time periods for delivery of mail entities originating and having a destination in major postal network distribution hubs are stored within the processing memory of mail processing and sorting equipment. Mailer's desire to have the mail entity delivered by a certain (future) date can be expressed as a record containing expected mail entity attributes which should be observed at the expected (future) date. This record is communicated by the mailer to the post via communications network 106 (FIG. 1).

The post makes measurements of mail entity attributes and resulting values are stored and processed. The post's measurements may be communicated by the post to the mailer via communications network 106 (FIG. 1).

Figure 3:
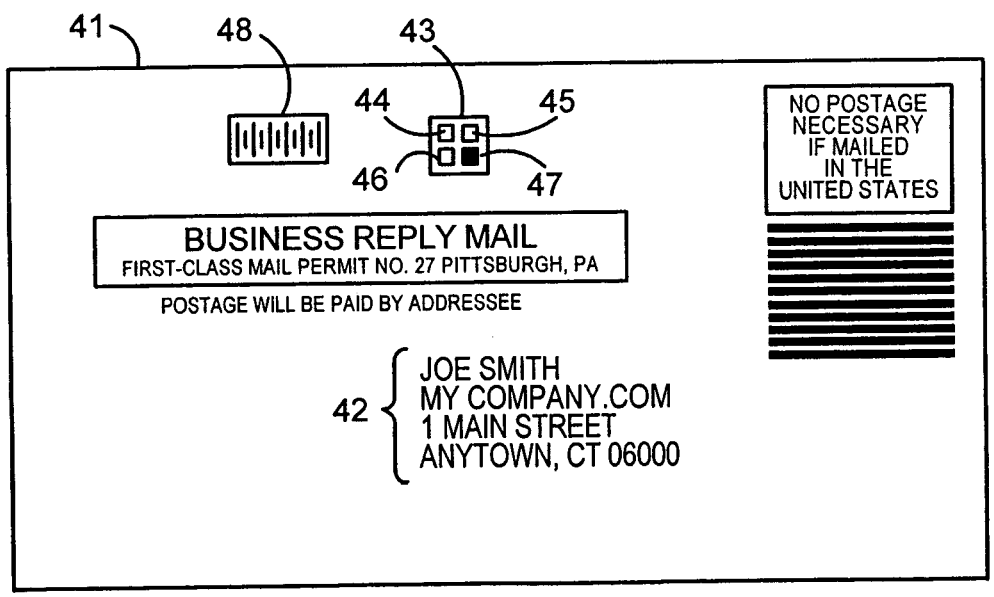
FIG. 3 is a drawing of a mail entity 41 that is uniquely linked to mail entity identifier 35 of FIG. 2.

FIG. 3 is a drawing of a mail entity 41 that is uniquely linked to mail entity identifier 35 of FIG. 2. Mail entity 41 may be Business Reply Mail that is contained in mail 31. Mail entity 41 has a recipient destination address block 42, a service indicator 43, and a mail identifier entity 48 that is uniquely linked to mail identifier entity 35 (FIG. 2). Service indicator 43 has blocks 44, 45, 46 and 47, which are similar to blocks 9, 10, 37, 38, 39 and 40 (FIG. 2). Block 47 is marked to indicate that John Jones, CEO Your company.com, 3 Main St., Anytown, Conn. 06000 (FIG. 2) has a new address.

If the location of the destination address block 32 (FIG. 2) is incorrect, then the postal equipment may not be able to read block 32. However, the postal equipment may be able to record the actual location of the block 32 and compare it to the expected location. As a result of the processing of this information, a message may be sent to the mailer indicating the improper location of block 32 via communications network 106 (FIG. 1).

FIG. 4 is a drawing showing the relationship between mail entities attributes, observations, expectations and events. Particularly, FIG. 4 defines the notions of Observation, Expectation and Event.

An observation is a collection of mail entity attributes captured at a specified time. For example, Observation M taken at time $t_M$ is a collection of mail entity attributes $A_1$, $A_2, \ldots A_N$ captured at time $t=t_M$. The notation used to indicate that attribute $A_K$ is captured at time $t=t_M$ is $A_K^M$.

Figure 12:
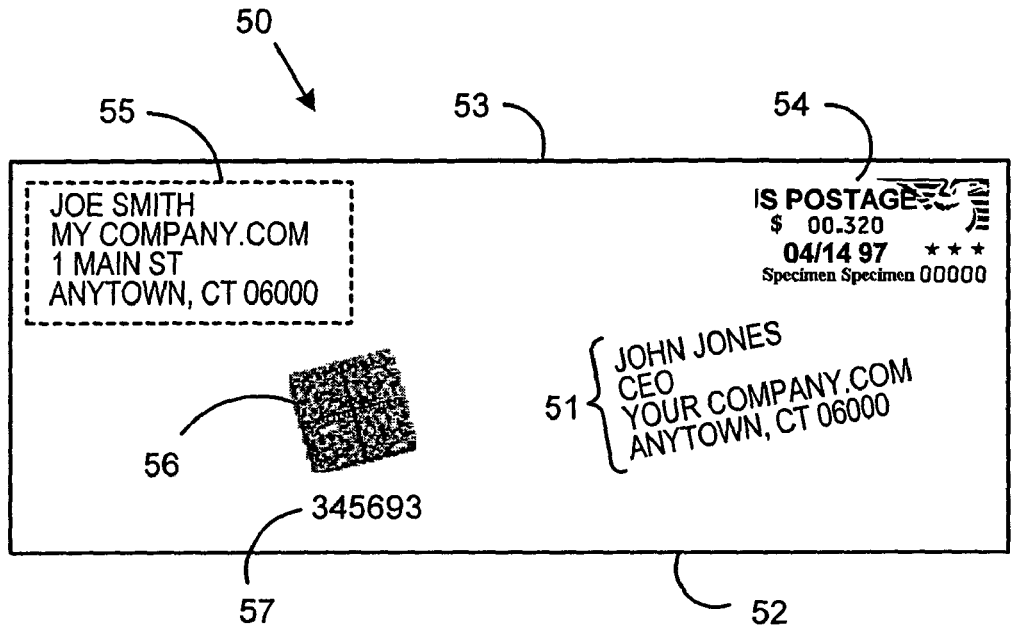
FIG. 12 is a drawing of mail entity 50 that has its recipient address field 51 skewed with respect to its bottom edge 52 and its top edge 50.
Figure 13:
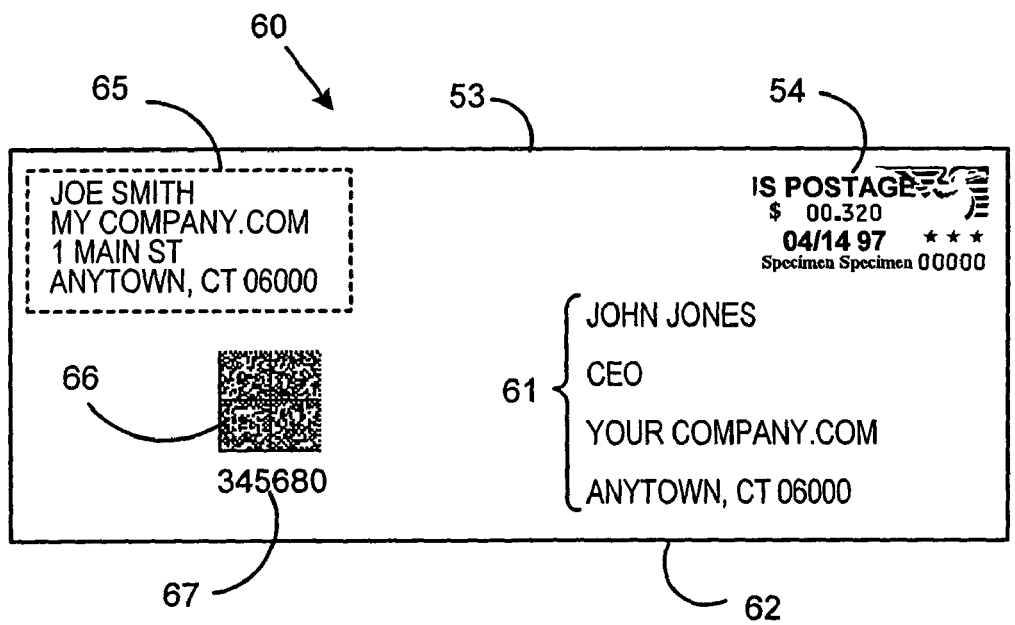
FIG. 13 is a drawing of a mail entity 60 that has improper line spacing of its address field 61.
Figure 15:
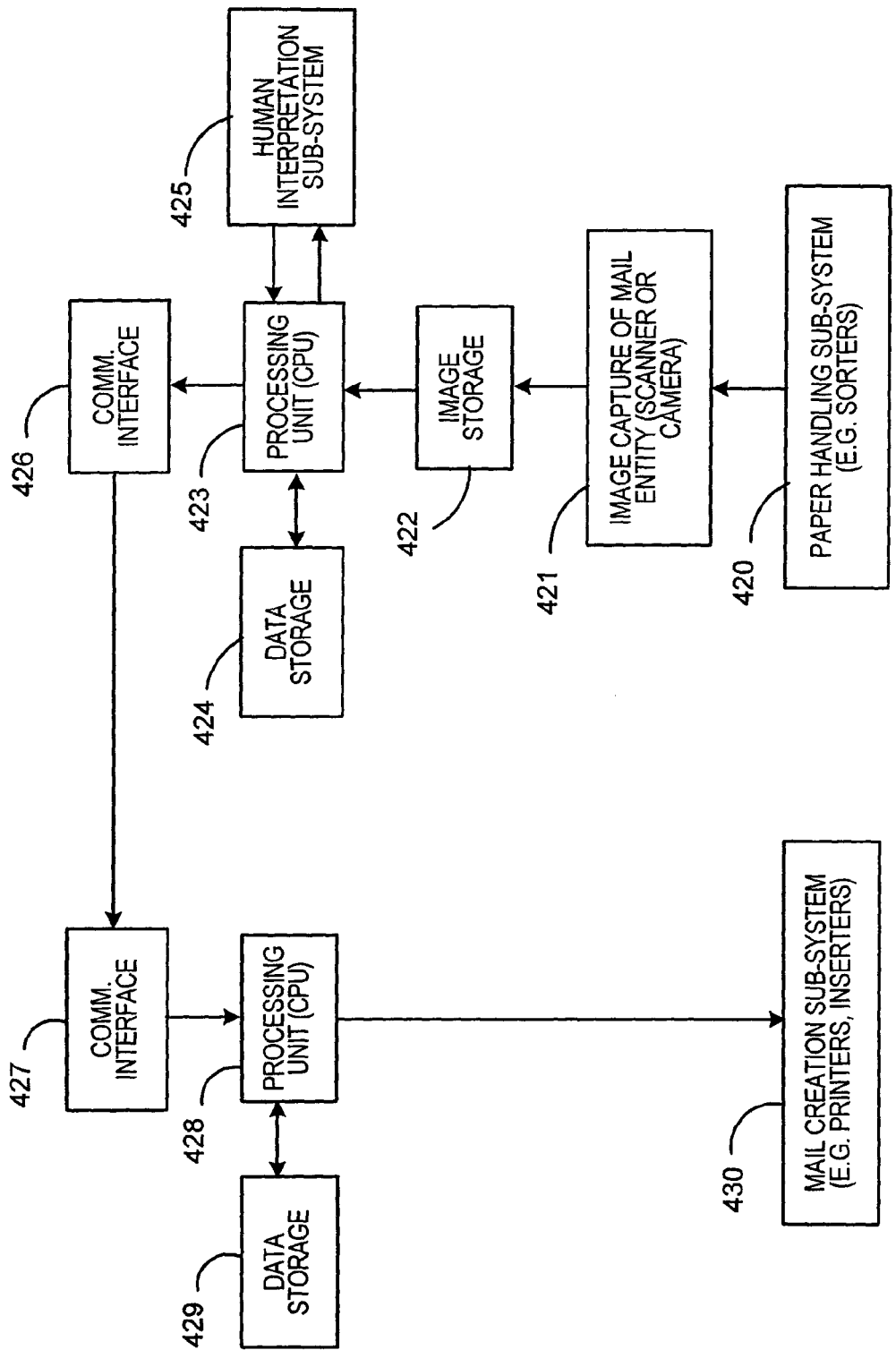
FIG. 15 illustrates a system which captures attributes of a mail entity attributes and communicates attribute values which are outside of expected ranges to the mailer.

Examples of Mail Entity Attributes are:

$A_1$ Acceptance location
$A_2$ Replacement delivery address
$A_3$ Acceptance location code
$A_4$ Acceptance location name
$A_5$ Date of acceptance
$A_6$ Post measured dimensions
$A_7$ Earliest delivery time
$A_8$ Express indicator
$A_9$ Handling class
$A_{10}$ Post determined handling constraints
$A_{11}$ Mail entity identifier as shown in FIG. 2 by identifier 35 and in FIG. 3 by identifier 48
$A_{12}$ Representation of Identifier 35 as shown in FIG. 2 and representation of identifier 48 as shown in FIG. 3 (2D bar code, text, etc.)
$A_{13}$ Measured gross weight
$A_{14}$ Actual proof of delivery
$A_{15}$ Replacement delivery address
$A_{16}$ Delivery last attempt
$A_{17}$ Delivery completion
$A_{18}$ Delivery failure
$A_{19}$ Process identifier
$A_{20}$ Status
$A_{21}$ Location
$A_{22}$ Condition
$A_{23}$ Measurements Confidence Level
$A_{24}$ Special Service Mark Image
$A_{25}$ Special Service Mark Position
$A_{26}$ Special Service Mark Size
$A_{27}$ Special Service Mark Parsed Elements
$A_{28}$ Digital Postage Mark 34 image
$A_{29}$ Digital Postage Mark 34 position
$A_{30}$ Digital Postage Mark 34 size
$A_{31}$ Digital Postage Mark 34 parsed elements
$A_{32}$ Image of DAB 32 as shown in FIG. 2 and image of DAB 42 as shown in FIG. 3
$A_{33}$ Position of DAB 32 as shown in FIG. 2 and position of DAB 42 as shown in FIG. 3
$A_{34}$ Size of DAB 32 as shown in FIG. 2 and size of DAB 42 as shown in FIG. 3
$A_{35}$ Parsed elements of DAB 32 as shown in FIG. 2 and parsed elements of DAB 42 as shown in FIG. 3
$A_{36}$ Address text corrected from DAB 32 as shown in FIG. 2 and address corrected of DAB 42 as shown in FIG. 3
$A_{37}$ Assigned aggregate (e.g. the identifier of the tray which contains this mail entity)
$A_{38}$ DAB skewed flag which is calculated by processing unit 423 as shown in FIG. 15
$A_{39}$ Skew angle of DAB 51 as shown in FIG. 12, or skew angle of bar code 56 as shown in FIG. 12
$A_{40}$ Flag indicating correct spacing of lines in DAB 61 as shown in FIG. 13
$A_{41}$ Distance between lines in DAB 61 as shown in FIG. 13

It would be obvious to one skilled in this art that there are many other attributes that may be defined based upon requirements of specific applications. Thus, the present application is easily and mechanically adapted to solving a broad class of problems related to any mail entity quality defects.

Observations are made by acquiring values for a set of attributes at a specific time $t_M$ and then storing the attributes as a record (Observation$_M$). This record of attributes defines the Observation at time $t_M$.

The attribute values may be obtained by actual measurements, computations or using predetermined (default) values. An example of default value is the NULL value which is assigned to all attributes at the beginning of the process, before any measurements are made. Another example of default value is the position of the Destination Address Block which known to the Mailer and is part of the mail production process.

For example if someone was to measure attributes $A_{13}$, $A_{17}$ and $A_{21}$ at time $t_1$ in a step of the Mailer's process 101 (FIG. 1) they may obtain the following values: $A_{13}$=32 oz, $A_{17}$=NULL since a NULL value in this instance indicates that information about the completion of delivery is not available, $A_{21}$="Stanford, Calif.". Then, if someone measured attributes $A_{13}$, $A_{17}$ and $A_{21}$ at time $t_7$ during a step of the Postal process 105 (FIG. 1) they may obtain the following values: $A_{13}$=32 oz, $A_{17}$=NULL, $A_{21}$="Sorter 27, Wallingford, Conn. Processing & Distribution Center". This is Observation$_7$. Then, if someone measured attribute $A_{13}$ at time $t_9$ during a step of the Recipient's process 103 (FIG. 1) they may obtain the following values: $A_{13}$=16 oz. This is Observation$_9$.

The above indicated that the weight of the mail item as measured in the Sender's and Recipient's environments was found to be different at different times and locations during the distribution process, these discrepancies (or defects) could be indicative of theft or adverse environmental conditions or security risks. An increase or decrease of the weight may be reported to the sender or a third party law enforcement agency.

The above also illustrates that every attribute is not available for all observations. The Observations may be distributed between several systems and sub-systems in the Mailer, Post and Recipient environments.

The Expectations are created before the first Observation. Or, they may be created or adjusted at a subsequent time. Thus, the Expectations may be created or adjusted at any time during the processing of the mail entity.

An Expectation created or adjusted at time $t_T$ is comprised of future values for a set of attributes at a specific time $t_{T+P}$. This record of attributes defines the Expectation at time $t_{T+P}$. An example of an Expectation is that at time $t_7$ anybody measuring attribute $A_{33}$ (Data Address Block position) during a step of the Post's process 105 (FIG. 1) is expected to obtain the following values: $A_{33}$=3 inches from the left edge of the mail item, 2 inches from the top edge of the mail item. This is Expectation$_7$ for Attribute$_{33}$.

At time $t_7$ a measurement of Attribute$_{33}$ indicates that the position of the Data Address Block is $A_{33}$=3 inches from the left edge of the mail item, 0.5 inches from the top edge of the mail item. Within the Post's process 105 (FIG. 1) Expectation$_7$ is compared with Observation$_7$. Because Attribute$_{33}$ has different values between the Observation$_7$ and Expectation$_7$ an Event is triggered.

By definition an event is triggered when the value of an attribute changes between either two Observations or between an Observation and an Expectation. By definition, a defect is noted when the value of an attribute changes outside of its expected range, or it is different from the expected value.

The Event $A^{J,K}$ includes the information regarding Observation$_J$ and Observation$_K$ (or Expectation$_K$), and the difference between the two observations (or between the Observation and the Expectation).

For example, in the case of Observation$_7$, the measured value of Attribute$_{33}$ is different from the value of Attribute$_{33}$ indicated for Attribute$_{33}$ in Expectation$_7$.

The information collected by the Observation$_7$, is stored in the processing units contained within the Postal process 105 (FIG. 1).

Those skilled in the art will realize that processing units employed to carry our the tasks associated with the mail processing in Postal Process 105, Mailer's Process 101 and Recipient's Process 103 (FIG. 1) include computation elements, data storage elements and communication elements.

In the example above, the Event triggered by the discrepancy between the expected value of DAB 32 (FIG. 2) position and the observed value of DAB 32 (FIG. 2) position will be reported to the mailer by the Post. Thus, the Mailer will be able to take corrective actions, if necessary, for future mailings by placing DAB 32 (FIG. 2) in the correct position. Furthermore, the Mailer may report to the Post that DAB 32 (FIG. 2) was in the correct position, thus the Postal equipment is likely to have malfunctioned and indicating erroneous values. It will be obvious to one skilled in the art that the aforementioned corrective actions notifications may be done in the opposite order.

In the above discussion the values of attributes that comprise Expectations can be expressed as ranges of values. For example, the expectation regarding the location of a sorting step may indicate a range of dates. Any Observation outside the given range will trigger an event that will report that the mail entity did not reach the processing step expected in time. Conversely, non-occurrence of an Observation will trigger an event as a result of comparing an Expectation with "lack of Observation".

Figure 5:
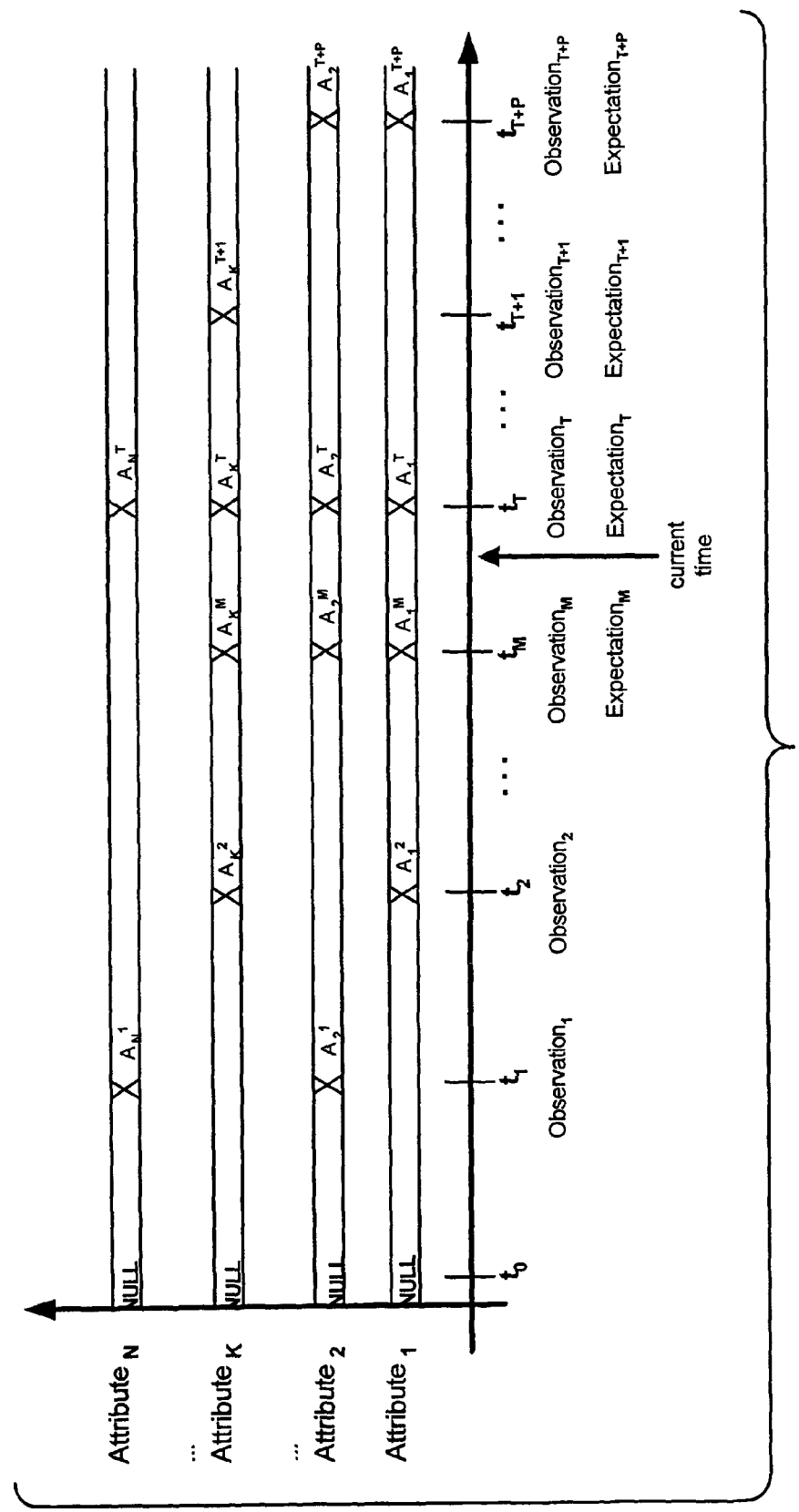
FIG. 5 is a illustration of the way values of attributes change (or remain the same) between Observations taken at various times and how Expectations are comprised of a similar set of Attribute values as Observations.

FIG. 5 is a illustration of the way values of attributes change (or remain the same) between Observations taken at various times and how Expectations are comprised of a similar set of Attribute values as Observations.

The above shows that only some, all or none of the attributes may change between Observations taken at different times. The values of attributes that comprise observations and expectations may be the same, in which case they do not result in a new event or they may be different, in which case they result in a new event.

Figure 6:
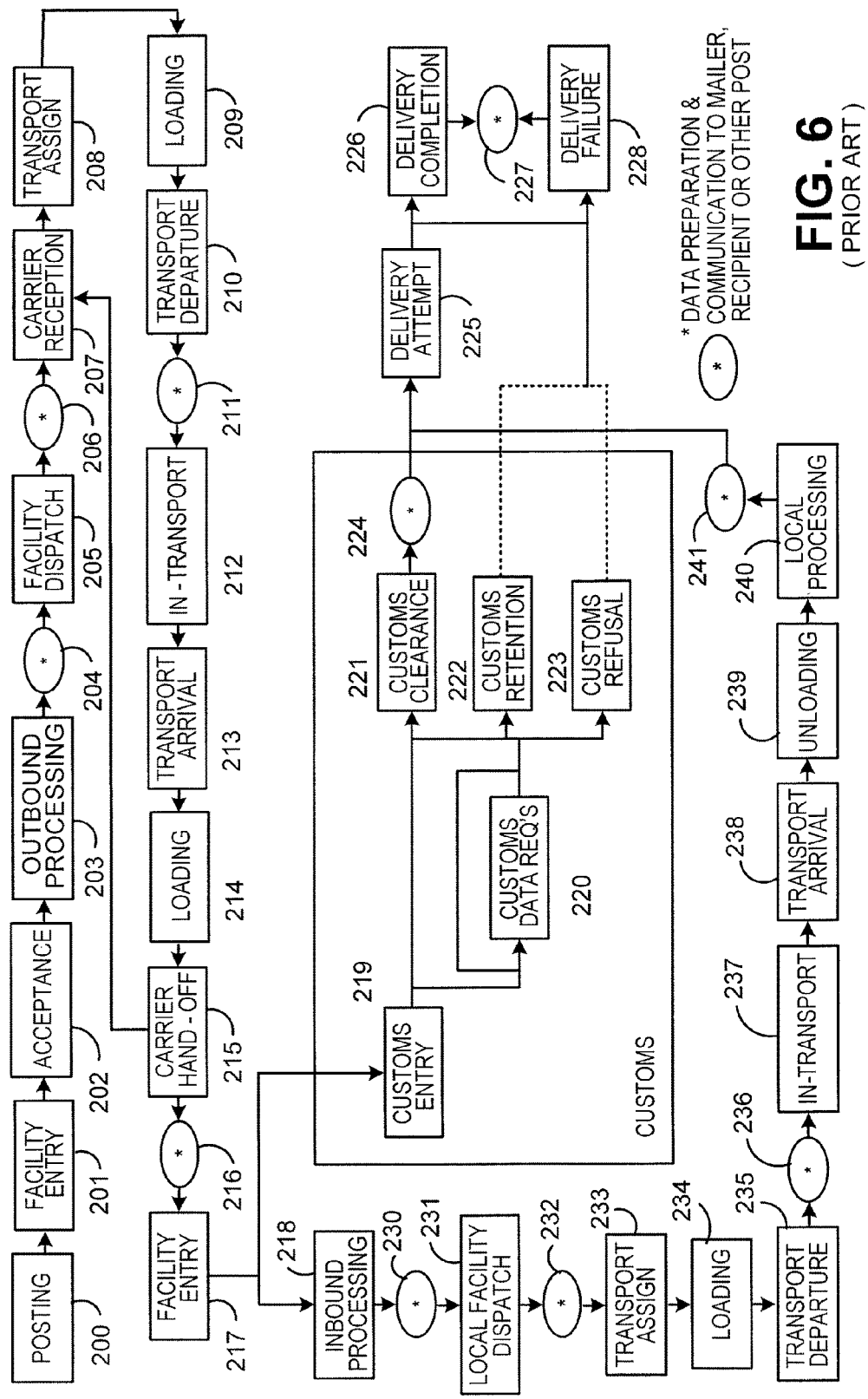
FIG. 6 is a drawing of a prior art postal process flow.

FIG. 6 is a drawing of a prior art postal process flow. Posting is performed in block 200. Then in block 201, the mail entities enter a postal facility. Followed by acceptance in block 202, where physical information is converted to electronic information by a scanning process. At this point outbound processing is accomplished in block 203, where physical information is converted to electrical information by scanning and electrical information is converted to physical information by printing information on tags. In block 204 data may be prepared and communicated to the mailer, the recipient or other post. Then the mail entities are dispatched to a facility in block 205, where physical information is converted within a tray scanning process to electronic information. Now processing is performed in block 156. Now in block 157 forwarding is accomplished by scanning the physical information into electrical information. Now in block 206 data may be prepared and communicated to the mailer, the recipient or other post. Carrier reception will now be received in block 207. Then in block 208 a transport is assigned. Then in block 209 loading takes place and physical information is converted to information during the tray scanning process. Now in block 210 the transport departs. Then in block 211 data may be prepared and communicated to the mailer, the recipient or other post. The mail entities are in transport in block 212. Then the mail entities arrive aboard a transport in block 213. Now loading is performed in block 214. Next in block 215 the carrier hands off the mail entities to a transport media so that they may travel to facility entry 217.

In block 216 data may be prepared and communicated to the mailer, the recipient or other post. Then in block 217, the mail entities enter a postal facility, where physical information is converted to information during the tray scanning process. Followed by in bound processing for domestic mail entities, in block 218 where physical information is converted to electronic information by a scanning process, or customs entry for mail entities that are going to be delivered in foreign countries. Physical information is also converted to electronic information by a scanning process in block 219.

For mail entities that are going to be delivered to foreign destinations they will go to block 220, to determine if they comply with customs data requirements. If the mail entities do not pass customs data requirements, the mail entities will go to block 222 for customs retention or block 223 for customs refusal.

If the mail entities pass customs data requirements, the mail entities will go to block 221 for customs clearance. Then, in block 224 data may be prepared and communicated to the mailer, the recipient or other post. At this point delivery is attempted in block 225, until the mail entities delivery is completed in block 226, where physical information may be converted to electrical information, or delivery failure is obtained in block 228. Upon delivery completion in block 226 or delivery failure in block 228, data may be prepared and communicated to the mailer, the recipient or other post in block 227.

For mail entities that are going to be delivered to domestic destinations they will go to block 230, after inbound processing in block 218. In block 230 data may be prepared and communicated to the mailer, the recipient or other post. Now in block 231 the mail entities will be dispatched from a local facility. Then in block 232 data may be prepared and communicated to the mailer, the recipient or other post. Now in block 233 a transport is assigned. At this point loading is performed in block 234. Then in block 235 the transport departs. Then in block 236 data may be prepared and communicated to the mailer, the recipient or other post. At this juncture the mail entities are in-transport in block 237. Transport arrival takes place in block 238. Transport unloading takes place in block 239. Then local processing takes place in block 240. Then, in block 241 data may be prepared and communicated to the mailer, the recipient or other post. At this point delivery is attempted in block 225, until the mail entities delivery is completed in block 226, where physical information may be converted to electrical information, or delivery failure is obtained in block 228. Upon delivery completion in block 226 or delivery failure in block 228, data may be prepared and communicated to the mailer, the recipient or other post in block 227.

Figure 7:
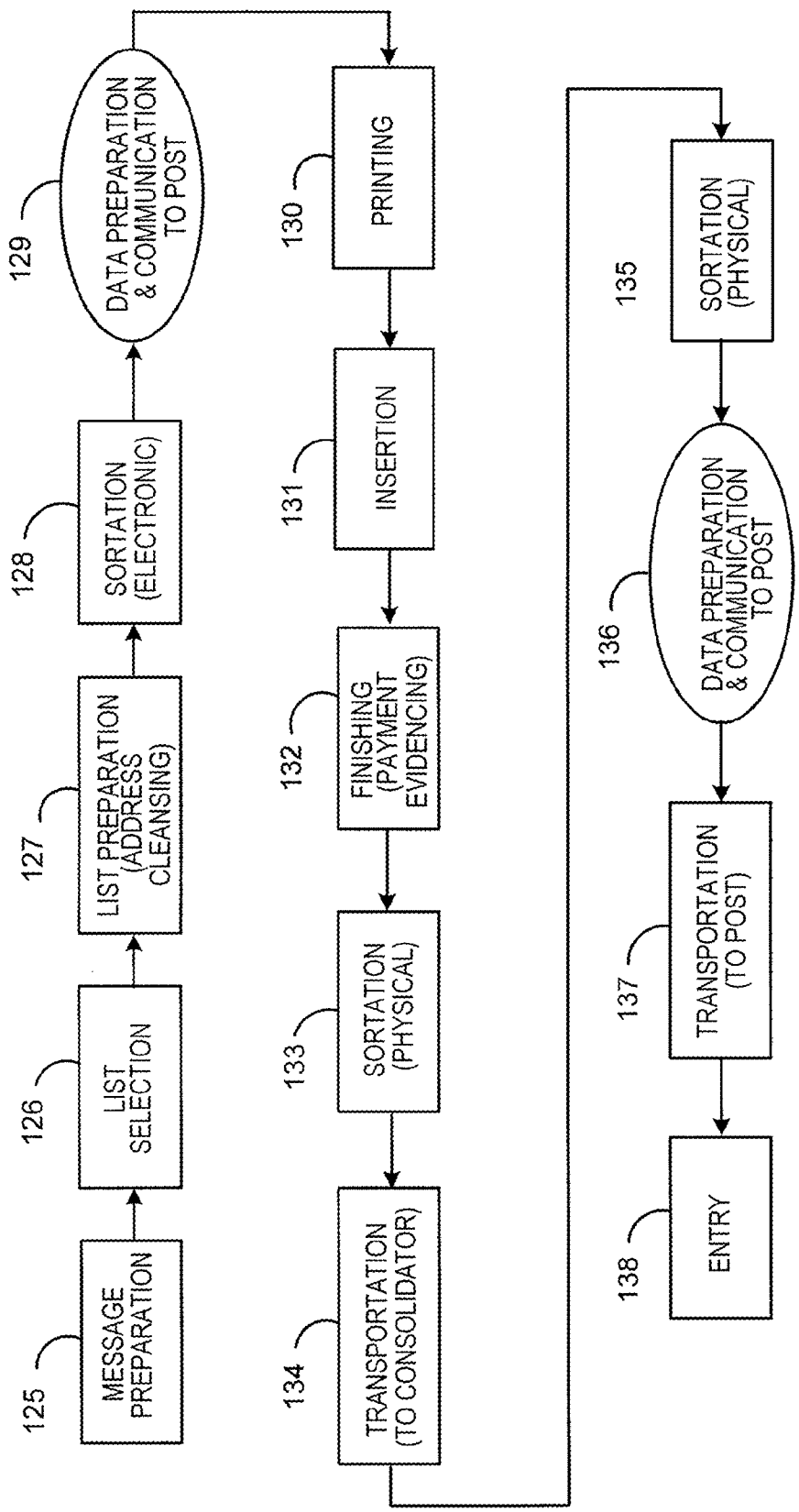
FIG. 7 is a drawing of a prior art mailer process flow.

FIG. 7 is a drawing of a prior art mailer process flow. Message preparation is performed in block 125. Then list selection is performed in block 126. Followed by list preparation and address cleansing in block 127. Electronic sortation is performed in block 128. At this point data preparation and communication to the post is performed in block 129. In the printing process in block 130, electronic information is presented in a physical form (printing). Then in block 131 the printed information is inserted into mail entities. In the finishing process, payment and evidencing functions are accomplished in block 132, and electronic information is converted to physical information presentation form. Now a physical sortation process is performed in block 133. Then in block 134 the transportation process, the mail entities are transported to a consolidator. A physical sortation process is performed in block 135. Then in block 136 the data is prepared and communicated to the Post. In block 137 (the transportation process), the mail entities are transported to the post. In entry block 138 the mail entities enter the postal environment.

Figure 8:
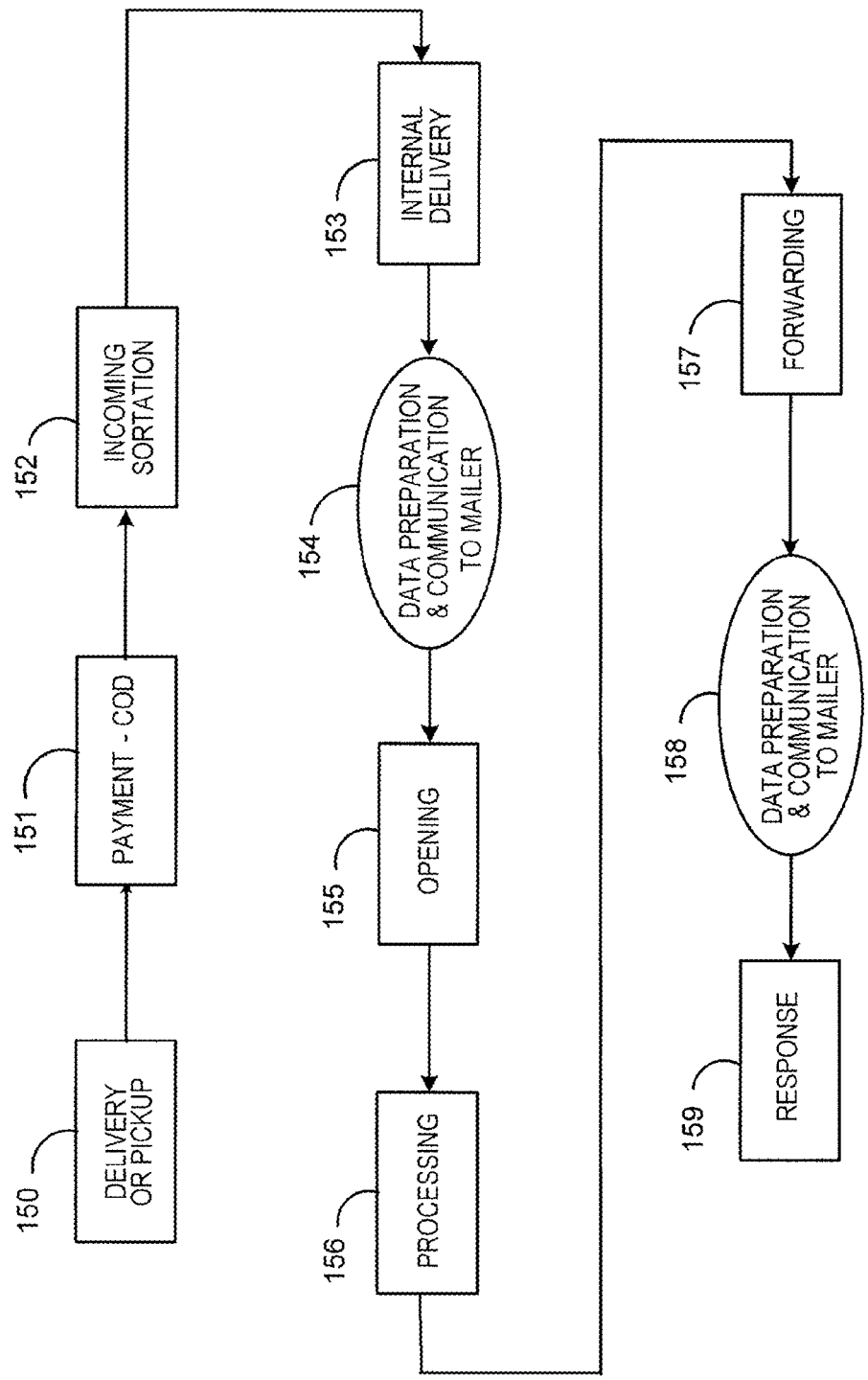
FIG. 8 is a drawing of a prior art recipient process flow.

FIG. 8 is a drawing of a prior art recipient process flow. Delivery or pick up of the mail entities is performed in block 150. Then payment (cash on delivery) is (optionally) performed in block 151. Followed by incoming sortation in block 152, where physical information is converted to electronic information by a scanning process. At this point, internal delivery is accomplished in block 153. In block 154 data is prepared and communicated to the mailer. Then the mail entities are opened in block 155. Now processing of mail content is performed in block 156. In block 157 forwarding is accomplished by scanning the physical information and conversion into electronic information. In block 158 data is prepared and communicated to the mailer. In block 159 responses are made.

Figure 9:
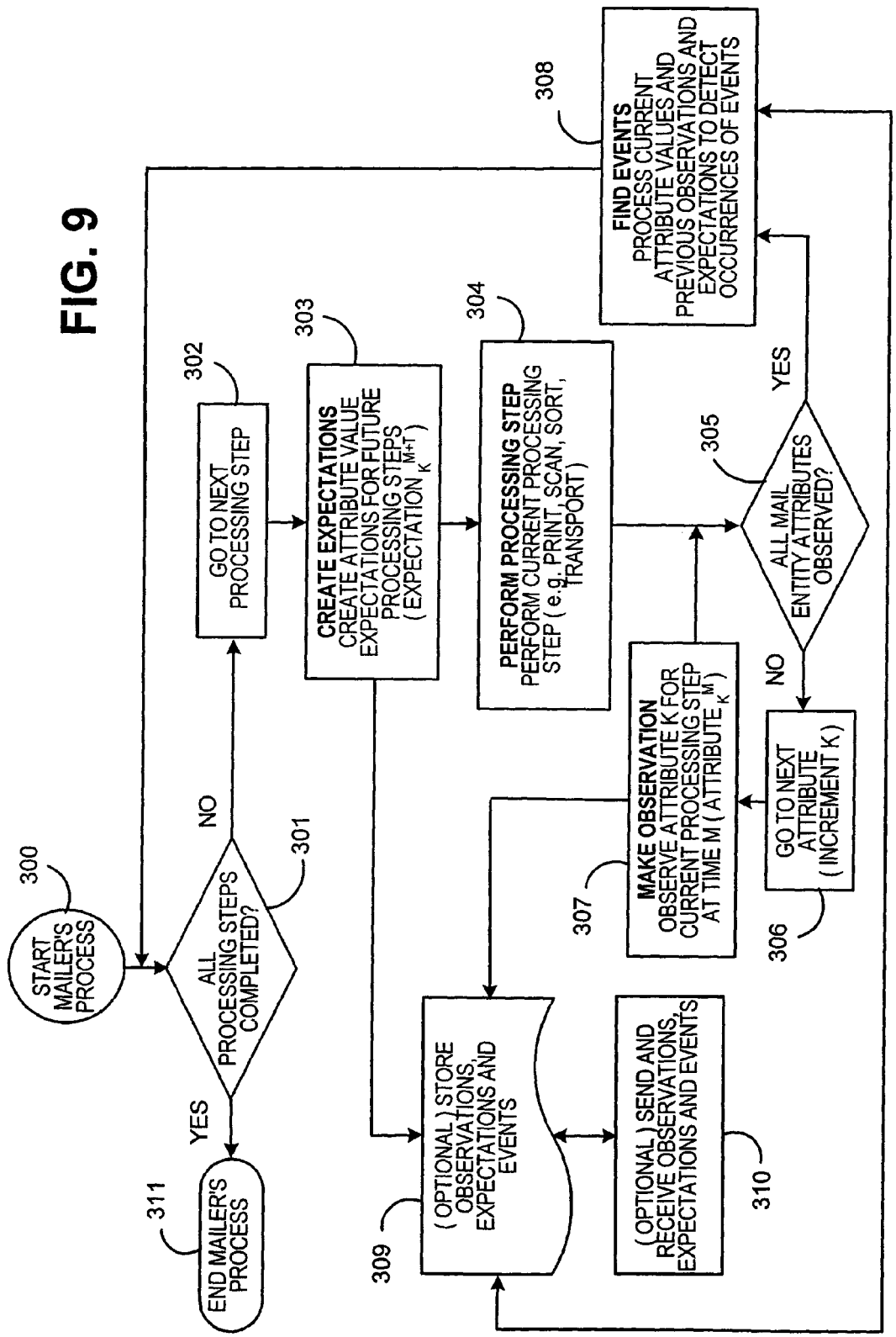
FIG. 9 is a flowchart of the process of creating observations and expectations in the Mailer's environment and communicating them to the Recipient and Post.

FIG. 9 is a flowchart of the process of creating observations and expectations in the Mailer's environment and communicating them to the Recipient and Post. The Mailer's process begins in step 300. Then the process goes to decision step 301. Step 301 determines whether or not all processing steps are complete. If step 301 determines that all processing steps are not complete the process goes to step 302, which is go to the next processing step. Now the process goes to step 303 to create expectations. The expectations are created by creating attribute value expectations for future processing steps (Expectation $K^{M+T}$). The attribute value expectations for future processing steps may optionally be stored in step 309. Then the process goes to step 304 to perform processing step. The processing step may be print, scan, sort, or transport. Then the process goes to decision step 305. Step 305 determines whether or not all mail entity attributes have been observed. If step 305 determines that all mail entity attributes have not been observed the process goes to step 306, which is to go to the next attribute (increment K). The next step in the process would be step 307, where an observation is made. For instance observe attribute K for the current processing step at time M (Attribute $K^M$). The next step in the process would be step 305 or step 309. At step 309 the process will optionally store observations, expectations and events. The next step will be step 310 or step 309. At step 310 the process will optionally send and receive observations, expectations and events. If step 305 determines that all mail entity attributes have been observed, the next step will be step 308. At step 308 the process finds events, i.e., process current attribute values and previous observations and expectations to detect occurrence of events. Optionally the observations and expectations from step 308 may be stored in step 309. Then the process goes back to the input of step 310. If step 301 determines that all processing steps are complete the process goes to step 311, end Mailer's process.

Figure 10:
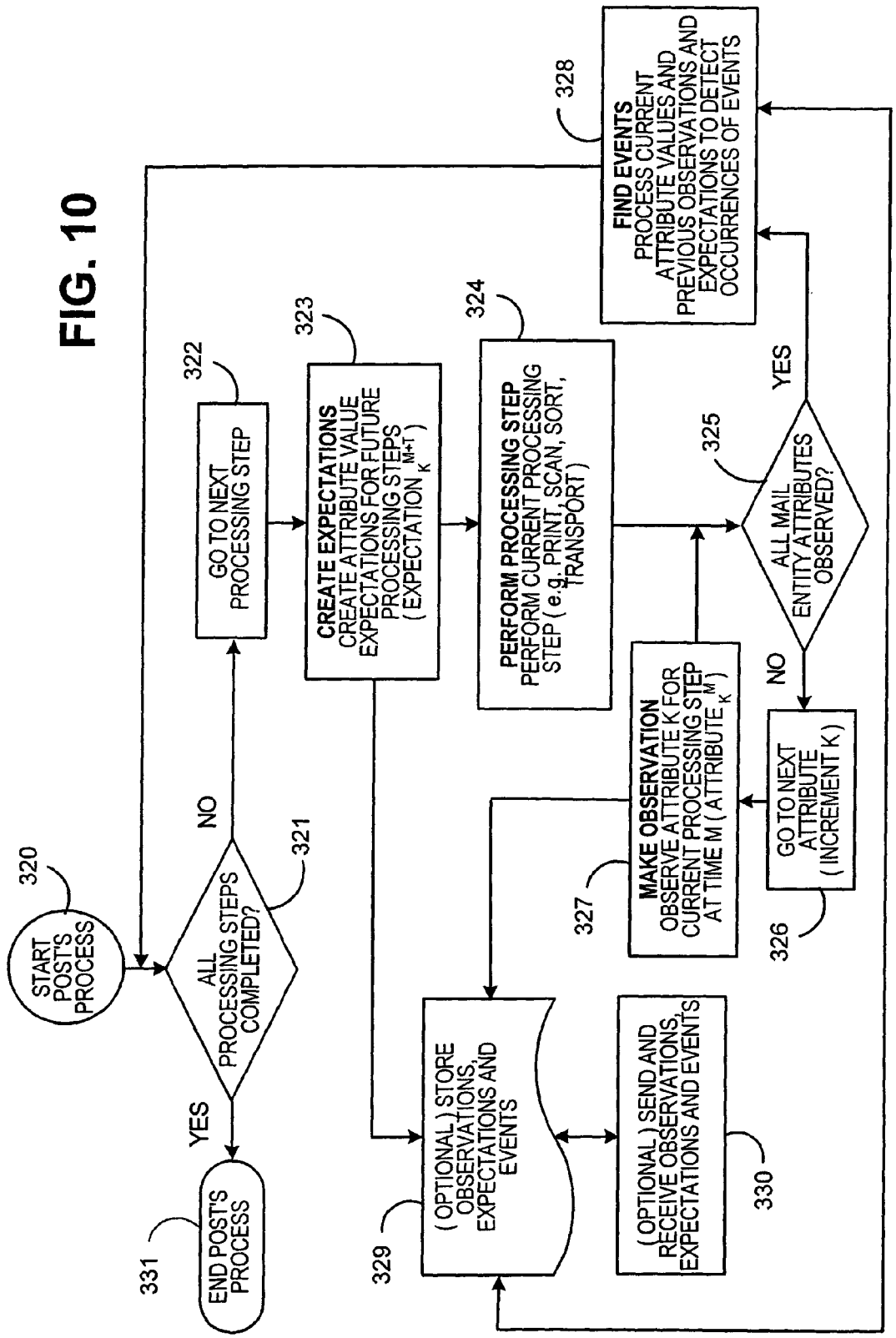
FIG. 10 is a flowchart of the process of creating observations and events in the Post's environment and communicating them to the Mailer and Recipient.

FIG. 10 is a flowchart of the process of creating observations and events in the Post's environment and communicating them to the Mailer and Recipient. The Post's process begins in step 320. Then the process goes to decision step 321. Step 321 determines whether or not all processing steps are complete. If step 321 determines that all processing steps are not complete the process goes to step 322, which is go to the next processing step. Now the process goes to step 323 to create expectations. The expectations are created by creating attribute value expectations for future processing steps (Expectation $K^{M+T}$). The attribute value expectations for future processing steps may optionally be stored in step 329. Then the process goes to step 324 to perform processing step. The processing step may be print, scan, sort, or transport. Then the process goes to decision step 325. Step 325 determines whether or not all mail entity attributes have been observed. If step 325 determines that all mail entity attributes have not been observed the process goes to step 326, which is to go to the next attribute (increment K). The next step in the process would be step 327, where an observation is made. For instance observe attribute K for the current processing step at time M (Attribute $K^M$). The next step in the process would be step 325 or step 329. At step 329 the process will optionally store observations, expectations and events. The next step will be step 330 or step 339. At step 330 the process will optionally send and receive observations, expectations and events. If step 325 determines that all mail entity attributes have been observed, the next step will be step 328. At step 328 the process finds events, i.e., process current attribute values and previous observations and expectations to detect occurrence of events. Optionally the observations and expectations from step 308 may be stored in step 309. Then the process goes back to the input of step 330. If step 321 determines that all processing steps are complete the process goes to step 331, end Post's process.

Figure 11:
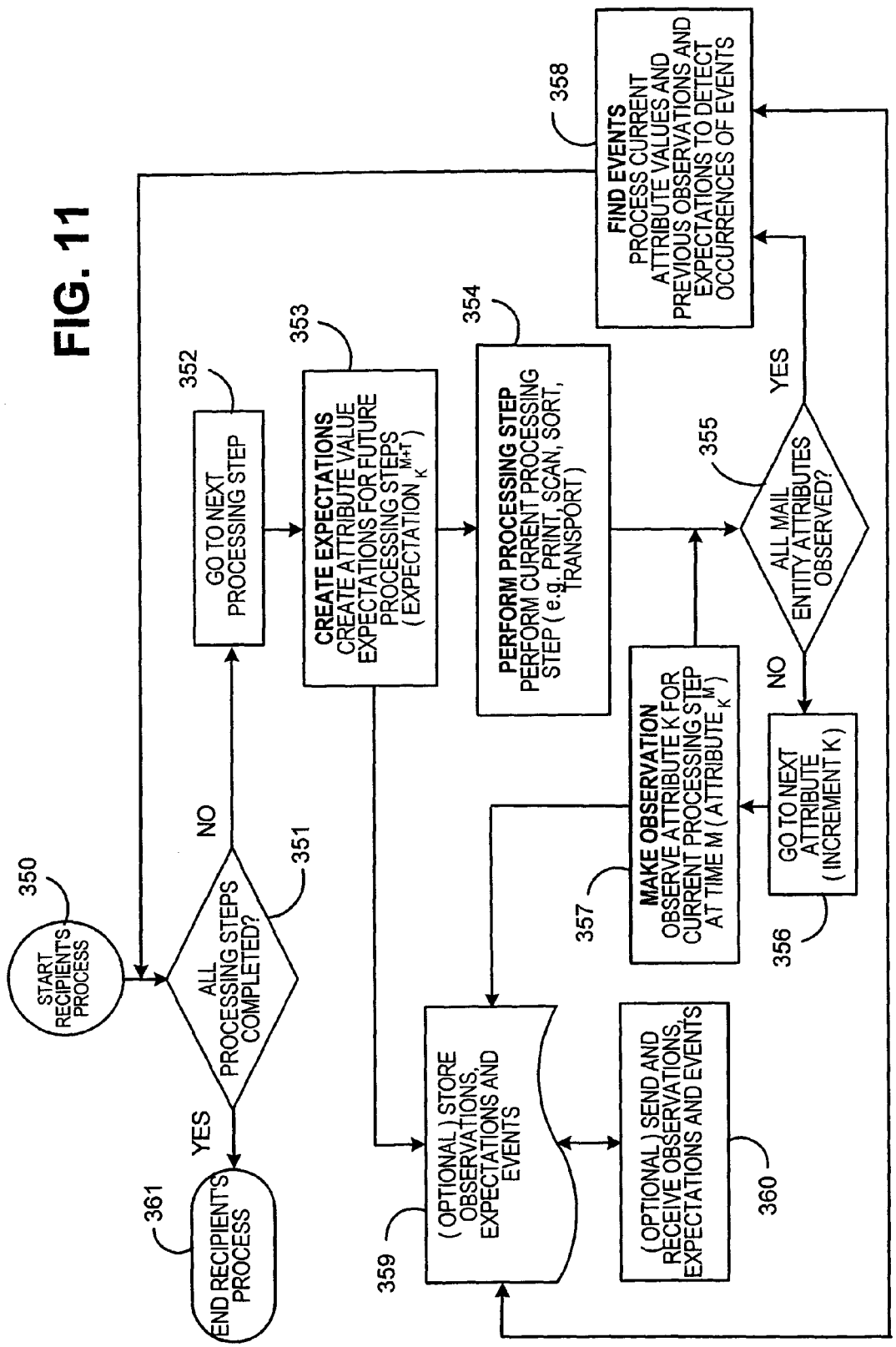
FIG. 11 is a flowchart of the process of creating observations and events in the Recipient's environment and communicating them to the Mailer and Post.

FIG. 11 is a flowchart of the process of creating observations and events in the Recipient's environment and communicating them to the Mailer and Post. The Recipient's process begins in step 350. Then the process goes to decision step 351. Step 351 determines whether or not all processing steps are complete. If step 351 determines that all processing steps are not complete the process goes to step 352, which is go to the next processing step. Now the process goes to step 353 to create expectations. The expectations are created by creating attribute value expectations for future processing steps (Expectation $K^{M+T}$). The attribute value expectations for future processing steps may optionally be stored in step 359. Then the process goes to step 354 to perform processing step. The processing step may be print, scan, sort, or transport. Then the process goes to decision step 355. Step 355 determines whether or not all mail entity attributes have been observed. If step 355 determines that all mail entity attributes have not been observed the process goes to step 356, which is to go to the next attribute (increment K). The next step in the process would be step 357, where an observation is made. For instance observe attribute K for the current processing step at time M (Attribute $K^M$). The next step in the process would be step 355 or step 359. At step 359 the process will optionally store observations, expectations and events. The next step will be step 360 or step 359. At step 360 the process will optionally send and receive observations, expectations and events. If step 355 determines that all mail entity attributes have been observed, the next step will be step 358. At step 358 the process finds events, i.e., process current attribute values and previous observations and expectations to detect occurrence of events. Optionally the observations and expectations from step 358 may be stored in step 359. Then the process goes back to the input of step 360. If step 351 determines that all processing steps are complete the process goes to step 361, end Recipient's process.

FIG. 12 is a drawing of mail entity 50 that has its recipient address field 51 skewed with respect to its bottom edge 52 and its top edge 50. Mail entity 50 has a indication of postal payment (stamp) 54, a origination address block 55, a mail entity identifier 57, and a bar code 56 that may contain identifier 57 and other indication of services requested by the mailer.

Mail processing and sorting equipment is programmed to automatically determine mail that has a skewed recipient address field 51 and/or skewed bar code 56. It would be obvious to one skilled in the art that other information may be placed on the mail entity in textual form and/or graphic form wherein the information may be skewed.

FIG. 13 is a drawing of a mail entity 60 that has improper line spacing of its address field 61. Mail entity 60 has a indication of postal payment (stamp) 64, a origination address block 65, a mail entity identifier 67, and a bar code 66 that may contain identifier 67.

Mail processing and sorting equipment is programmed to automatically determine mail that has improper line spacing of its address field 61. It would be obvious to one skilled in the art that other information on the mail entity may have improper spacing, placement, orientation, relative position, etc.

Figure 14:
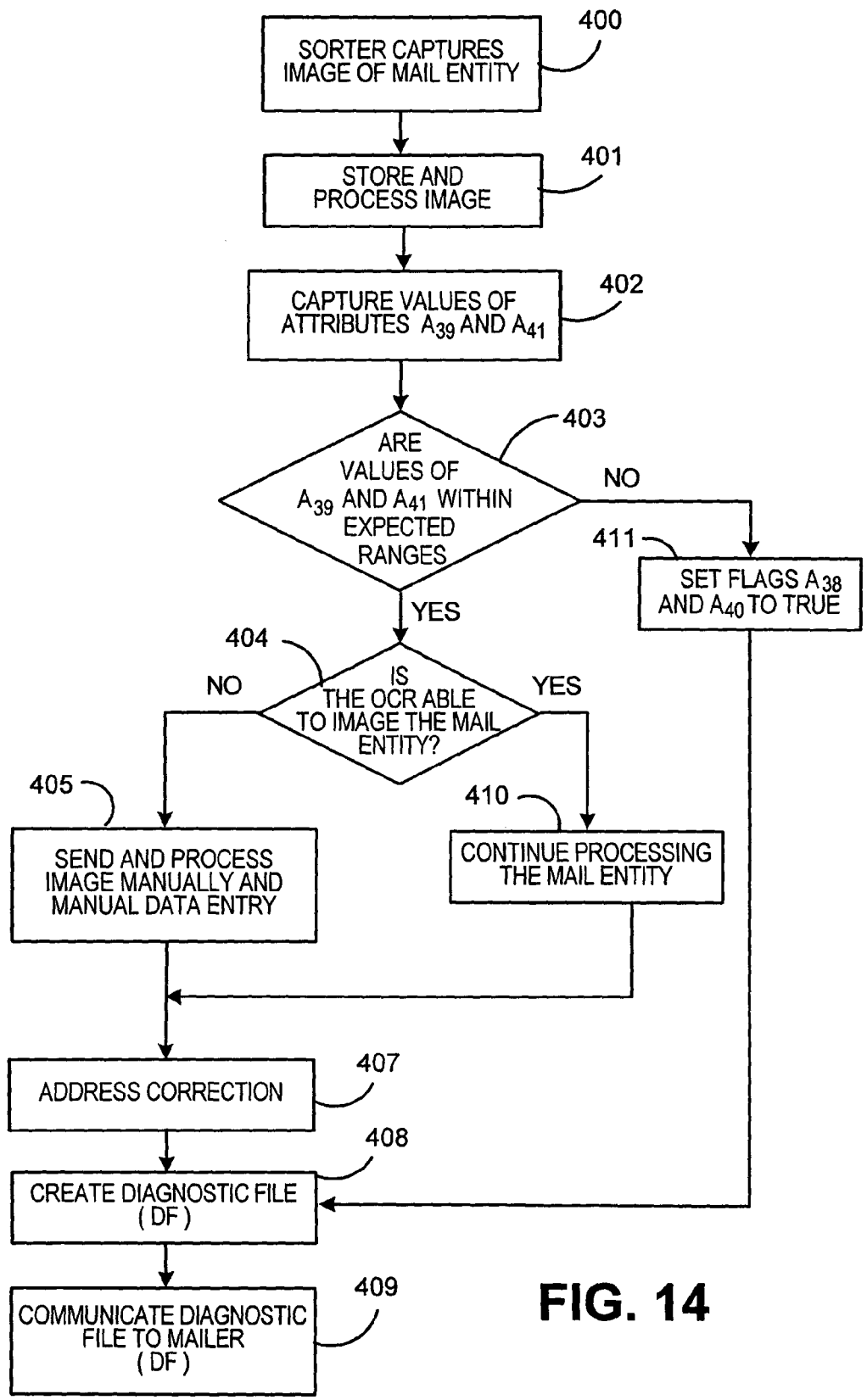
FIG. 14 is a flowchart of data capture and communication of defects to the mailer during mail processing in the postal system.

FIG. 14 is a flowchart of data capture and communication of defects to the mailer during mail processing in the postal system. The process begins in step 400, where a mail handling sub system, i.e., sorter, facer canceller, etc. captures the image on the face and/or back of mail entities 50 and 60. Then the process goes to step 401. Step 401 stores and processes the captured image. Then the process goes to step 402 to capture the values of attributes $A_{39}$, and $A_{41}$. The image captured in step 401 is analyzed in processing unit 423 (FIG. 15) to locate DAB 51 by locating the boundaries and the corners of DAB 51, the skew of DAB 51, which is referred to as $A_{39}$ may be calculated with respect to the top edge 53 and bottom edge 52 of mail entity 50. The image of DAB 51 is analyzed to locate individual text lines and measure the distance between the lines which is referred to as $A_{41}$. Then the process goes to decision step 403 to determine whether or not the values of attributes $A_{39}$ and $A_{41}$ are within expected ranges. If step 403 determines that either of the attributes $A_{39}$ or $A_{41}$ are not within expected ranges then the process goes to step 411. In step 411 the flags $A_{38}$ or $A_{40}$ corresponding to the attributes $A_{39}$ or $A_{41}$ which are outside expected ranges will be set to true. At this point the process goes to step 408 to create a diagnostic file indicating the attributes not within expected ranges and containing the values of the attributes $A_{39}$ and $A_{41}$. If step 403 determines that attributes $A_{39}$ and $A_{41}$ are within expected ranges then the process goes to step 404. Step 404 determines whether or not the OCR equipment is able to recognize the text of the address in DAB 51 or DAB 61 of the mail entity. If step 404 determines that the OCR equipment failed to recognize the text in DAB 51 or DAB 61 the next step will be step 405. In step 405 the image is sent to human interpretation sub-system 425 (FIG. 15) for manual data entry.

Next in step 407 address correction of the mail entity is performed by a dedicated address verification and correction data base. Now the process goes to step 408 to create a diagnostic file (DF). Then in step 409 the diagnostic file is communicated to the mailer via communications network 106 (FIG. 1). If step 404 determines that the OCR equipment is able to recognize the text in the DAB the mail entity the next step in the process will be step 410. In step 410 the mail entity will continue to be processed. Then the next step will be step 407. Even though the OCR was successful in step 404, while processing the mail in step 410, the mailer will be informed in step 408 that the skew and/or line spacing was outside expected ranges but the OCR equipment was able to read the information.

FIG. 15 illustrates a system which captures attributes of a mail entity attributes and communicates attribute values which are outside of expected ranges to the mailer. Paper handling sub-system 420 utilizes a sorter, facer/canceller, etc. to process the mail entity. Then a scanner or camera 421 images the face and back of the mail entity. Now the captured image or images are stored in a image storage memory together with the mail entities unique identifiers.

One or more local or distributed central processing units 423 determine whether or not attributes $A_{39}$, and $A_{41}$ of the image or images are within expected ranges. If the aforementioned attributes are within expected ranges, their values are stored in data storage 424 together with the mail entities unique identifiers. If the aforementioned attributes are not within expected ranges the flags of attributes $A_{38}$ and $A_{40}$ will be set to true and a human will utilize interpretation sub-system 425, to process the image and transmit its results to central processing unit 423. The aforementioned results are then stored in data storage 424 together with the mail entities unique identifiers. Now the values of the attributes $A_{38}$, $A_{39}$, $A_{40}$ and $A_{41}$ of the image or images and unique identifiers are transmitted to postal communications interface 426.

The information sent to postal communications interface 426 is transmitted to mailer communications interface 427. Mailers central processing unit 428 will now receive values of the attributes $A_{38}$, $A_{39}$, $A_{40}$ and $A_{41}$ of the image or images together with the unique identifier of the mail entities. Central processing unit 428 will store the above transmitted information in data storage 429 and the update data contained in data storage 428. Mail-creation sub-system 430, i.e., printers, inserters, etc. will use the updated data to produce mail entities that do not have the same attribute errors that were heretofore present. Thus, the mailer will improve his preparation of mail entities and the Post will find it easier to process and deliver mail in a timely manner.

The above specification describes a new and improved method for providing the mailer with detailed information regarding mailer's preparation of mail entities and the post's processing of mail entities. It is realized that the above description may indicate to those skilled in the art additional ways in which the principles of this invention may be used without departing from the spirit. Therefore, it is intended that this invention be limited only the scope of the appended claims.

What is claimed is:

1. A method for providing a Mailer, Post or Recipient with detailed information regarding attributes of mail entities, said method comprising the steps of:
    (A) determining values of a plurality of attributes during preparation taken at two different points of time and during delivery taken at two different points of time of the mail entity;
    (B) determining unique identity information present on a mail entity;
    (C) detecting values of the plurality of attributes which are outside of expected ranges;
    (D) classifying, by a processing device, the attributes which are outside of expected ranges;
    (E) communicating the attributes which are outside of expected ranges to the mailer using the unique identity information as a reference to a mailer and a post to allow the mailer, the post and a recipient to distinguish between mailer processing defects of the mail entities and errors caused by faulty post equipment or faulty recipient process; and
    (F) communicating by the Recipient to one of the Post and the Mailer corrections to the attributes.

2. The method claimed in claim 1, further including the step of:
    applying by the mailer the classified attributes to correct information on future mail entities.

3. The method claimed in claim 1, further including the step of: communicating by the Post the classified attributes to the Recipient.

4. The method claimed in claim 1, further including the step of: communicating by the Post the mail entity attributes to the Mailer.

5. The method claimed in claim 1, further including the step of: communicating by the Post the mail entity attributes to the Recipient.

6. The method claimed in claim 1, wherein step C further includes the step of:
    comparing a value of the plurality of attributes during preparation of the mail entity at the second point in time with the value of the plurality of attributes during preparation of the mail entity at the first point in time.

7. The method claimed in claim 1, wherein step C further includes the step of:
    deciding whether or not the detected values of the plurality of attributes are within a expected range.

8. The method claimed in claim 7, wherein if a detected value is not within the expected range then a change in value of the plurality of attributes of the mail entity will be stored and/or communicated.

9. The method claimed in claim 7, wherein if a detected value is within the expected range then a change in value of the plurality of attributes of the mail entity attribute will:
    not be noted and not communicated; or
    be noted and not communicated; or
    not be noted and communicated.

10. The method claimed in claim 1, further including the steps of:
    creating an expectation for a value of the plurality of attributes at a future point in time; and
    observing a value of the plurality of attributes at the future point in time.

11. The method claimed in claim 10, further including the step of:
    comparing the expectation for a value of the plurality of attributes with the observed value of the plurality of attributes.

12. The method claimed in claim 1, further including the steps of:
    creating an expectation for a range of values for the attribute at a future point in time; and
    observing a value of the plurality of attributes at the future point in time.

13. The method claimed in claim 12 further including the step of:
    comparing the expectation of a range of values of the plurality of attributes with the observed value of the attribute.

14. The method claimed in claim 1, wherein one of the plurality of attributes represents spacing between recorded lines of material recorded on the mail entity.

15. The method claimed in claim 1, wherein one of the plurality of attributes represents skewing of material recorded on the mail entity.

16. The method claimed in claim 1, wherein one of the plurality of attributes represents a skew angle or angles of material recorded on the mail entity.

17. The method claimed in claim 1, wherein one of the plurality of attributes represents position of recorded material recorded on the mail entity.

18. The method claimed in claim 1, further including the steps of:
    defining events during preparation of the mail entity as changes in values, of the plurality of attributes within ranges taken at two different points of time during preparation of the mail entity due to observations at the two different points of time; and
    defining events during delivery of the mail entity as changes in values of the plurality of attributes within ranges taken at two different points of time during delivery of the mail entity due to observations at the two different points of time.

19. The method claimed in claim 1, further including the step of defining events as changes in values of combinations of the plurality of attributes due to observations taken at the two different points of time.

20. The method claimed in claim 1, further including the steps of:
    defining events during preparation of the mail entity as changes in values of the plurality of attributes within probabilities of values taken at two different points of time during prepared of the mail entity due to observations at the two different points of time; and
    defining events during delivery of the mail entity as changes in values of the plurality of attributes within probabilities of values taken at two different points of time during delivery of the mail entity due to observations at the two different points of time.

21. The method claimed in claim 1, wherein step C further includes the step of:
    Comparing a value of an attribute during delivery of the mail entity at the second point of time with the value of the attribute during delivery of the mail entity at the first point of time.

* * * * *